No. 634,150. Patented Oct. 3, 1899.
W. R. SPRUILL, Sr. & W. R. SPRUILL, Jr.
BALL BEARING FOR VEHICLE WHEELS.
(Application filed Dec. 31, 1898.)

(No Model.)

Witnesses
J. Frank Culverwell.
H. J. Riley

W. R. Spruill Sr,
and W. R. Spruill Jr. Inventors.
By their Attorneys,
C. A. Snow & Co.

UNITED STATES PATENT OFFICE.

WILLIAM R. SPRUILL, SR., AND WILLIAM R. SPRUILL, JR., OF EDENTON, NORTH CAROLINA.

BALL-BEARING FOR VEHICLE-WHEELS.

SPECIFICATION forming part of Letters Patent No. 634,150, dated October 3, 1899.

Application filed December 31, 1898. Serial No. 700,823. (No model.)

*To all whom it may concern:*

Be it known that we, WILLIAM R. SPRUILL, Sr., and WILLIAM R. SPRUILL, Jr., citizens of the United States, residing at Edenton, in the county of Chowan and State of North Carolina, have invented a new and useful Ball-Bearing for Vehicle-Wheels, of which the following is a specification.

The invention relates to improvements in ball-bearings for vehicle-wheels.

The object of the present invention is to improve the construction of ball-bearings for vehicle-wheels, and to provide a simple, inexpensive, and efficient one which while being dust-proof will reduce the friction to a minimum and permit a wheel to be readily removed from an axle without losing any of the balls from their cups.

The invention consists in the construction and novel combination and arrangement of parts hereinafter fully described, illustrated in the accompanying drawings, and pointed out in the claim hereto appended.

Figure 1:
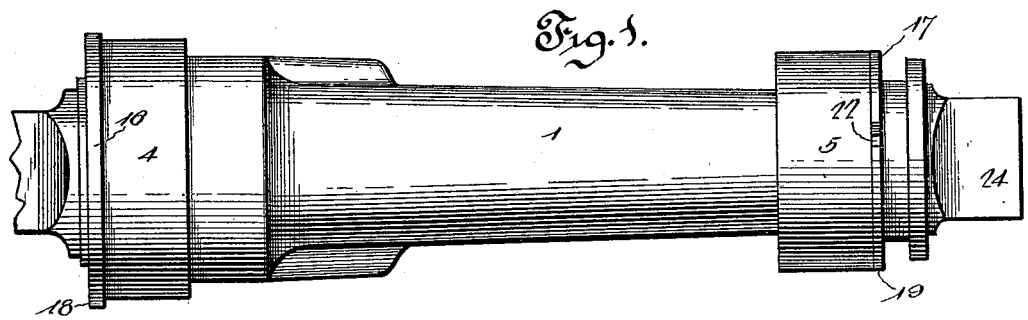
Figure 2:
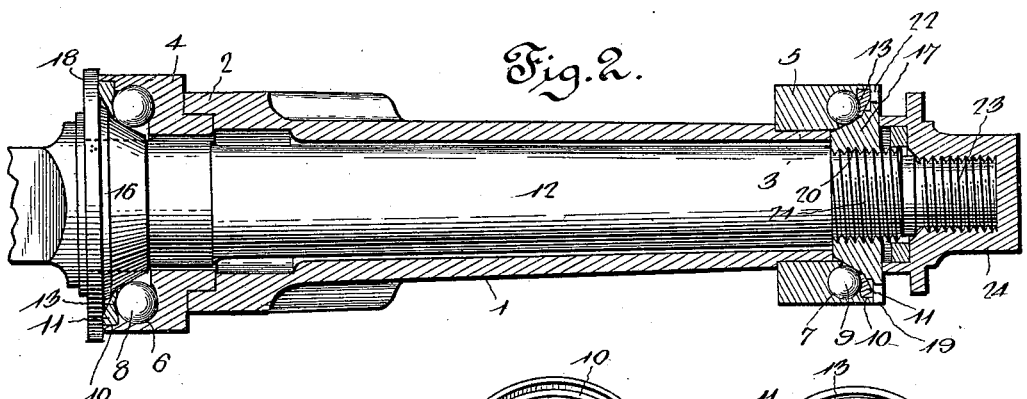
Figures 3, 4, 5, 6:
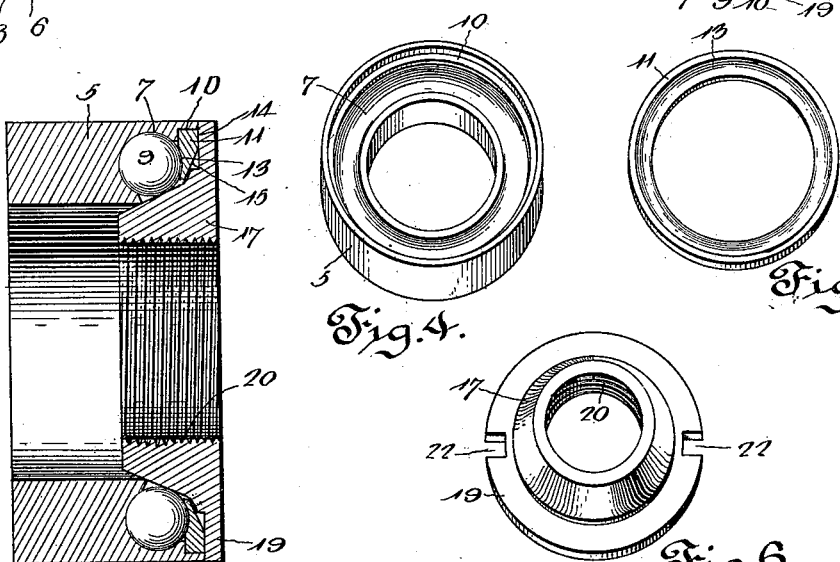

In the drawings, Figure 1 is an elevation of a ball-bearing axle constructed in accordance with this invention. Fig. 2 is a longitudinal sectional view of the same, the spindle being shown in elevation. Fig. 3 is an enlarged sectional view of one end of the bearing. Fig. 4 is a detail perspective view of one of the ball-cups. Fig. 5 is a similar view of one of the retaining-rings. Fig. 6 is a detail perspective view of the outer cone.

Like numerals of reference designate corresponding parts in all the figures of the drawings.

1 designates an axle-box designed to be secured within the hub of a wheel in the usual manner and having its inner and outer ends 2 and 3 reduced for the reception of inner and outer ball-cups 4 and 5, which are similar in construction, with the exception that the inner ball-cup, which is arranged at the larger end of the axle-box, is provided with larger balls and is of greater diameter than the outer ball-cup. The ball-cups 4 and 5, which are substantially cylindrical, are provided at their outer faces or ends with grooves 6 and 7, forming races for balls 8 and 9, and each cup is reduced interiorly beyond the ball-race to provide an annular recess or seat 10 for the reception of a retaining-ring 11 for holding the balls in the cups when the wheel is removed from a spindle 12. The inner face of the retaining-ring is provided with a groove 13, forming the outer wall of the adjacent ball-race, and the outer faces of the retaining-ring have flat portions 14 and beveled portions 15. The grooves of the retaining-rings present concavely-curved bearing-faces, which form continuations of the curved bearing-faces of the inner and outer ball-cups. The outer flat portions 14 are flush with the adjacent edges of the ball-cups and the inner beveled faces conform to the configuration of inner and outer cones 16 and 17, mounted on the spindle and located at the inner and outer ends thereof. The inner cone 16, which is preferably driven on the spindle, fits within the inner bearing-cup and receives the projecting portions of the balls, as clearly illustrated in Fig. 2 of the accompanying drawings, and it is provided with an annular flange 18, which fits over the end of the cup and has its periphery flush with the outer face of said cup. The outer cone, which fits within the outer ball-cup, is provided with an annular flange 19, similar to the flange 18, and the said outer cone is interiorly threaded at 20 and engages an inner threaded portion 21 of the spindle. The flanges of the cones exclude dust from the bearing, and the retaining-rings also assist in making the bearing dust-proof. The flange of the outer cone is provided with recesses 22, adapted to receive a suitable tool to enable the outer cone to be readily screwed on and off the spindle, and the outer end of the latter is also provided with a threaded portion 23 for the reception of an ordinary axle-nut 24.

The invention has the following advantages: The ball-bearing, which is simple and comparatively inexpensive in construction, is dust-proof and adapted to reduce the friction to a minimum. The retaining-rings, which are carried by the ball-cups, complete the ball-races and prevent the balls from leaving the cup when a wheel is removed. Also the rings which render the ball-cups dust-proof are beveled at their outer faces to fit the inner and outer cones, and the latter are provided with annular flanges that close the outer ends of the cups.

Changes in the form, proportion, and minor details of construction may be resorted to without departing from the spirit or sacrificing any of the advantages of this invention.

What is claimed is—

A ball-bearing comprising an axle-box, ball-cups arranged at the ends of the axle-box and provided with grooves having curved bearing-faces and forming ball-races, the retaining-rings arranged wholly within the ball-cups and having their outer faces flush with the outer edges of the same, said retaining-rings being provided with grooves presenting concavely-curved bearing-faces forming continuations of the bearing-faces of the ball-cups and constituting the outer walls of the ball-races, balls arranged within the ball-races, and the inner and outer cones fitting within the ball-cups and provided with annular flanges engaging the outer faces of the retaining-rings and the outer edges of the ball-cups, substantially as described.

In testimony that we claim the foregoing as our own we have hereto affixed our signatures in the presence of two witnesses.

WM. R. SPRUILL, SR.
WM. R. SPRUILL, JR.

Witnesses:
D. B. RICKARD,
B. C. HENDERSON.